(12) United States Patent
Perrone

(10) Patent No.: US 8,926,332 B2
(45) Date of Patent: *Jan. 6, 2015

(54) FORCIBLE ENTRY TRAINING DOOR SYSTEM

(71) Applicant: Michael Perrone, Seaford, NY (US)

(72) Inventor: Michael Perrone, Seaford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/853,085

(22) Filed: Mar. 29, 2013

(65) Prior Publication Data

US 2013/0224700 A1   Aug. 29, 2013

Related U.S. Application Data

(63) Continuation of application No. 13/040,213, filed on Mar. 3, 2011, now Pat. No. 8,408,917.

(51) Int. Cl.
  *G09B 19/00*   (2006.01)
  *A62C 99/00*   (2010.01)
(52) U.S. Cl.
  CPC .......... *A62C 99/0081* (2013.01); *G09B 19/003* (2013.01)

USPC .......................................... 434/226
(58) Field of Classification Search
  USPC ............ 434/219, 226, 247, 258; 49/381, 394, 49/504; 292/163, 219, 240, 241, 261
  See application file for complete search history.

(56) References Cited

U.S. PATENT DOCUMENTS

| | | | |
|---|---|---|---|
| 4,015,382 A * | 4/1977 | Noyes | 52/211 |
| 7,611,356 B1 * | 11/2009 | Bishop | 434/226 |
| 7,789,666 B2 * | 9/2010 | Sovine et al. | 434/226 |
| 7,972,139 B2 * | 7/2011 | Staub | 434/226 |
| 8,128,408 B2 * | 3/2012 | Phillips et al. | 434/226 |
| 8,167,621 B2 * | 5/2012 | Allen | 434/226 |
| 8,197,257 B2 * | 6/2012 | Clewis | 434/226 |
| 2005/0050816 A1 * | 3/2005 | Manning et al. | 52/213 |

* cited by examiner

Primary Examiner — Kurt Fernstrom

(57) ABSTRACT

The present invention relates generally to apparatus for training the art of forcible door entry for emergency personnel such as firefighters and, in particular, a reusable forcible entry door training prop adapted to simulate a locked door and allow individuals to conduct training in forcible entry techniques for different door types and mounting configurations (e.g., opening inward or outward, left hand opening or right band opening, steel jam or wood jams).

17 Claims, 12 Drawing Sheets

FORCIBLE ENTRY TRAINING DOOR SYSTEM

CROSS-REFERENCE TO RELATED APPLICATION

This application is a Continuation of U.S. patent application Ser. No. 13/040,213, filed on Mar. 3, 2011, which claims priority to U.S. Provisional Patent Application Ser. No. 61/311,775, filed on Mar. 9, 2010, the disclosures of which are fully incorporated herein by reference.

TECHNICAL FIELD

The present invention relates generally to apparatus for training the art of forcible door entry for emergency personnel such as firefighters and, in particular, a reusable forcible entry door training prop adapted to simulate a locked door and allow individuals to conduct training in forcible entry techniques for different door types and mounting configurations (e.g., opening inward or outward, left hand opening or right hand opening, steel jam or wood jams).

BACKGROUND

In emergency situations, police, firefighters, and other first responders may need to forcibly enter a building or dwelling to gain access in order to save lives. One common method of forcible entry involves forcibly opening a locked door. To master the skill of forcible door entry, one should have a basic knowledge of the types and doors and security devices that may be encountered, as well as knowledge training in the types of tools that may be used for forcible door entry.

Emergency Services typically rely on a number of different devices to force entry to a building or vehicle. Prying tools, such as "Halligan" tools and crowbars are common tools used to breach doors and windows. A Halligan is a special tool commonly used by firefighters for prying, twisting, punching, or striking. FIG. 1 schematically illustrates a conventional "Halligan" tool that is commonly used by firefighters for forcible door entry. The tool (10) includes a claw (or fork) (11) a blade (wedge) (12) (what is commonly referred to as an ADZ end), and a tapered pick (13), which is especially useful in quickly forcing open many types of locked doors. Either the ADZ end or fork end of the tool can be used to break through the latch of a swinging door by forcing the tool between the door and doorjamb and prying the two apart, striking it with a flat-head axe, for example.

To know how to correctly and efficiently open a locked door in an emergency using a Halligan tool for instance, a person needs to be trained and then to perfect the knowledge by practice. In particular, knowledge of the type of door and its components is important to allow proper placement and use of a forcible entry tool such as a Halligan tool. For instance, the direction of the door opening (inward opening and outward) and the type and material composition of the door frame (wood, metal) are important factors in the manner in which forcible entry of a locked door is conducted.

SUMMARY OF THE INVENTION

Exemplary embodiments of the invention include portable and reusable forcible entry door training props adapted to simulate a locked door and allow individuals to conduct training in forcible entry techniques for different door types and mounting configurations (e.g., opening inward or outward, left hand opening or right band opening, steel jam or wood jams).

In one exemplary embodiment of the invention, a forcible entry door training apparatus includes a base plate, a door frame mounted to the base plate, the door frame comprising a first side jamb, a second side jamb and a header jamb coupled between upper ends of the first and second side jambs, a door having a first side edge and a second side edge, and a plurality of hinges attaching the first side edge of the door to the first side jamb of the door frame for hingedly mounting the door within the door frame. The hinges are mounted to the first side jamb for slidable motion to and way from an inner surface of the first side jamb and wherein the hinges include springs that bias the slidable hinges away from the inner surface of the first side jamb and which resist compression with sufficient force to simulate forces that are encountered when attempting to wedge a pry tool between the second side edge of the door and the second side jamb.

In one embodiment, the hinges are U-shaped brackets comprising a front plate that is disposed adjacent the inner surface of the first side jamb, and side plates that are disposed on each side of the first side jamb. The side plates of the U-shaped brackets are slidably disposed between guide rails on the side surfaces of the first side jamb.

In another exemplary embodiment of the invention, the hinges are adapted to hingedly mount at least two doors within the door frame.

In yet another exemplary embodiment of the invention, a forcible entry door training further includes a removable jamb plate including a door stop attached to the second side jamb. The removable jamb plate is adjustable to change a spacing between the second side edge of the door and the jamb plate.

In another exemplary embodiment, the forcible entry door training apparatus farther includes a first retaining bracket disposed on the door and a second retaining bracket disposed on the second side jamb, aligned to the first retaining bracket, wherein the first and second retaining brackets insertably receive an elongated resistance member to simulate resistive forces of a locking device to keep the door from opening. An elongated resistance member can be extended through the first and second retaining brackets. The elongated resistance member may be a length of wood.

These and other exemplary embodiments, aspects, features and advantages, of the present invention will become apparent from the following detailed description of exemplary embodiments, that is to be read in connection with the accompanying drawings.

BRIEF DESCRIPTION OF DRAWINGS

FIGS. 3A, 38, 3C and 3D are schematic plane views of a forcible entry door training apparatus according to an exemplary embodiment of the invention.

DETAILED DESCRIPTION OF EXEMPLARY EMBODIMENTS

Figure 2A:
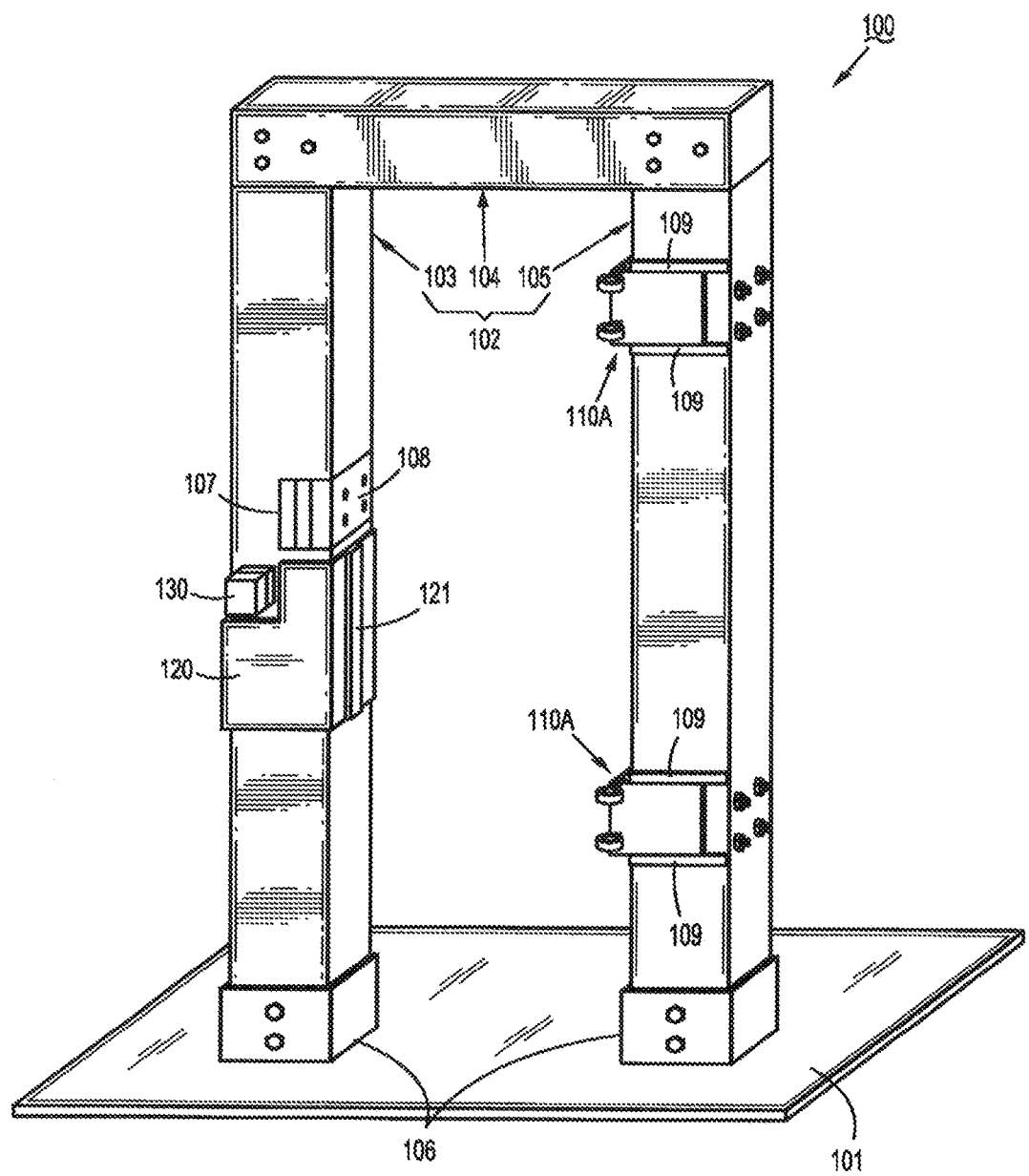
FIGS. 2A and 2B are schematic perspective views of components of a forcible entry door training apparatus according to an exemplary embodiment of the invention.
Figure 2B:
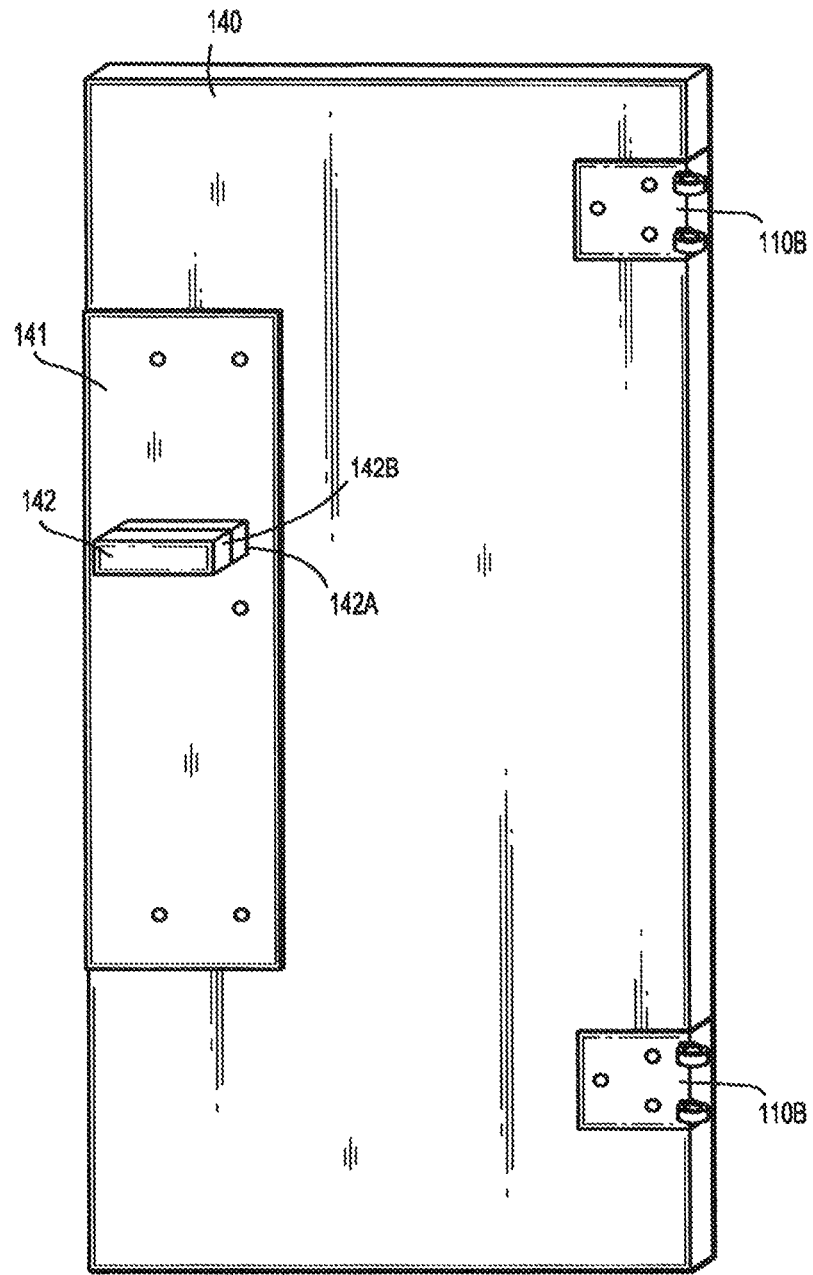

Exemplary embodiments of reusable forcible entry training devices which are adapted to simulate a locked door and allow individuals to conduct training in forcible entry techniques, will now be discussed in further detail with initial reference to FIGS. 2A, 2B and 3A~3D. FIGS. 2A and 2B axe schematic perspective views of a frame structure and door, respectively, of an exemplary training device (100). As shown in FIG. 2A, an exemplary forcible entry training device (100) includes a base plate (101) and a frame structure (102) mounted to the base plate (101). The frame (102) comprises a first side jamb (103) (or door stop jamb), a header jamb (104), and a second side jamb (105) (or hinge jamb), wherein the header jamb (104) is coupled between upper ends of the first and second side jambs (103) and (105). The bottom of the side jambs (103) and (105) are removably mounted to the base (101) by mounting elements (106). The various frame elements are preferably made of steel or other suitable material, wherein the side jambs are preferably made of tubular steel.

Figure 3A:
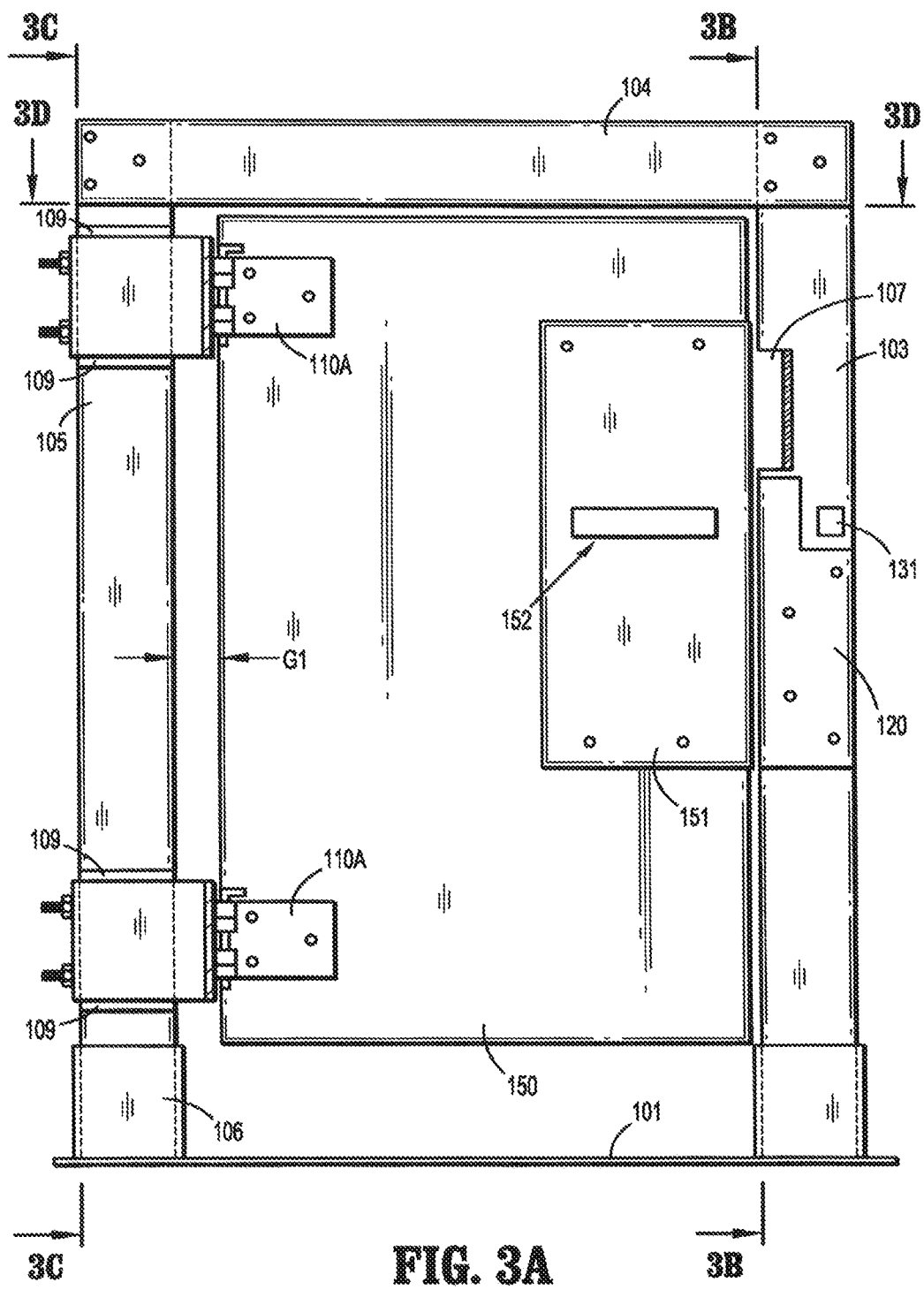
Figure 3B:
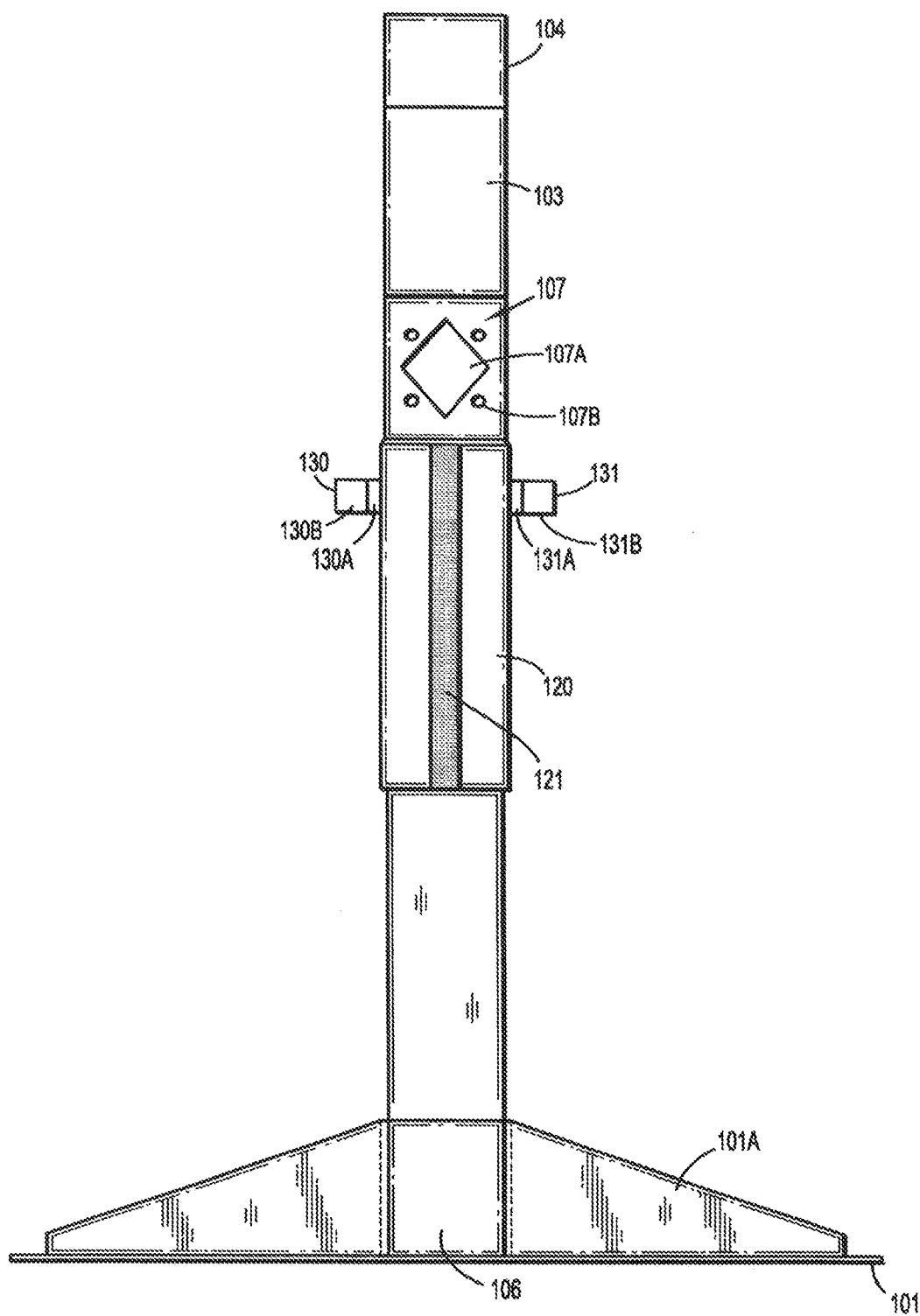
Figure 3C:
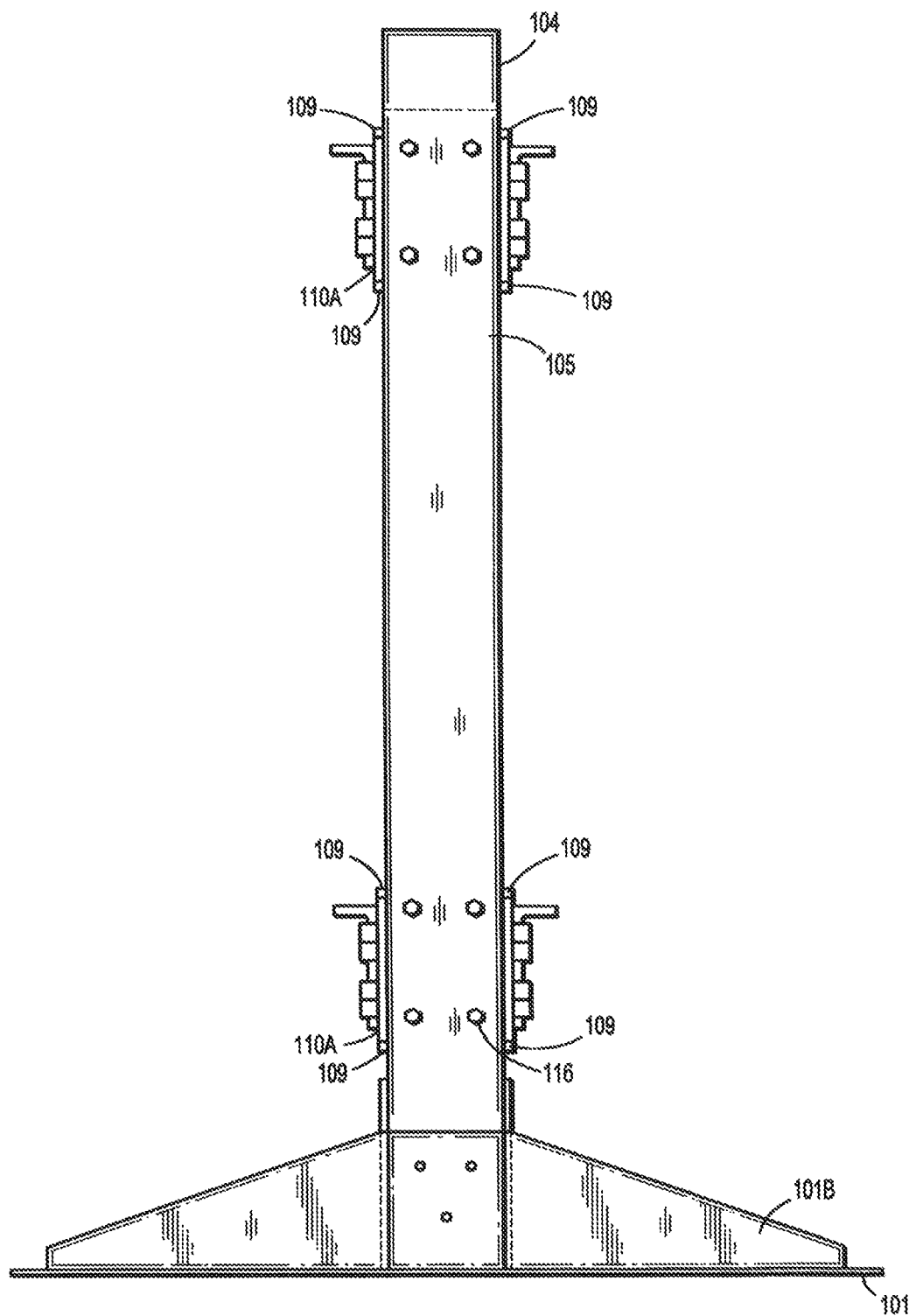

FIG. 2B illustrates a first removable door (140) that may be mounted to the frame (102). FIG. 3A is a schematic front plane view of the exemplary training device (100) showing a second removable door (150) mounted to the frame (102). FIG. 3B is a schematic side view taken along line 3B-3B in FIG. 3A showing an inner side surface of the door stop jamb (103). FIG. 3C is a schematic side view taken along line 3C-3C in FIG. 3A showing an outside surface of the hinge jamb (105) and FIG. 3D is a schematic top view taken along line 3D-3D in FIG. 3A showing first and second doors (140) and (150) mounted between the jambs (105) and (103).

Referring to FIGS. 2A-2B and 3A-3D collectively, the frame (102) includes various components including a removable jamb plate (120) including a door stop (121), a wood block (108) that is removably disposed in a recessed portion (107) of the door stop jamb (103), a plurality of spring-loaded hinges (110a) that are slideably mounted on the hinge jamb (105) within a channel formed by retaining rails (109), a plurality of retaining brackets (130) and (131) that are disposed on opposing sides of the door stop jamb (103).

The doors (140) and (150) include door hinge members (110b) that mateabley connect to the hinges (110a) mounted on the hinge jamb (105) of the frame (102). The doors (140) and (150) can be made of steel or wood. The doors (140) and (150) may include respective thin steel plates (141) and (151) that wrap around the front, side and back portions of the door to provided added strength and protection and structural integrity. The doors (140) and (150) include respective retaining brackets (142) and (152) fixedly disposed on outside surfaces thereof and the retaining brackets (142) and (152) are welded to the plates (141) and (151).

Figure 3D:
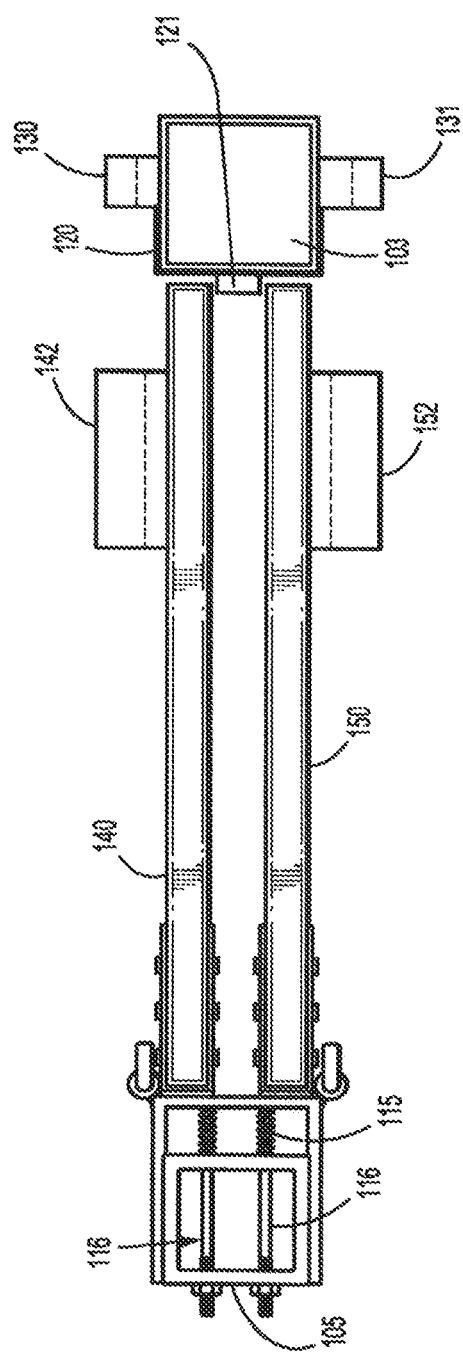

As depicted in FIG. 3D, for example, the retaining brackets (142) and (152) are disposed in alignment with respective retaining brackets (130) and (131) on door stop jamb (103) and each having separate inner channels (142A, 142B) and (152A, 152B) that are aligned to with separate inner channels (130A, 130B) and (131A, 131B) of brackets (130) and (131). As discussed in further detail below, the retaining brackets (130), (142) and (131), (152) are employed to insertably receive resistance bars (e.g., a 1×2 length of wood furring strip or 2×3 studs) that are inserted through the channels to simulate a locking device to keep the door from opening and simulate the resistive forces that are encountered when trying to force open a locked door by breaking a lock or driving the lock (e.g., deadbolt) off the door.

Figures 4A, 4B:
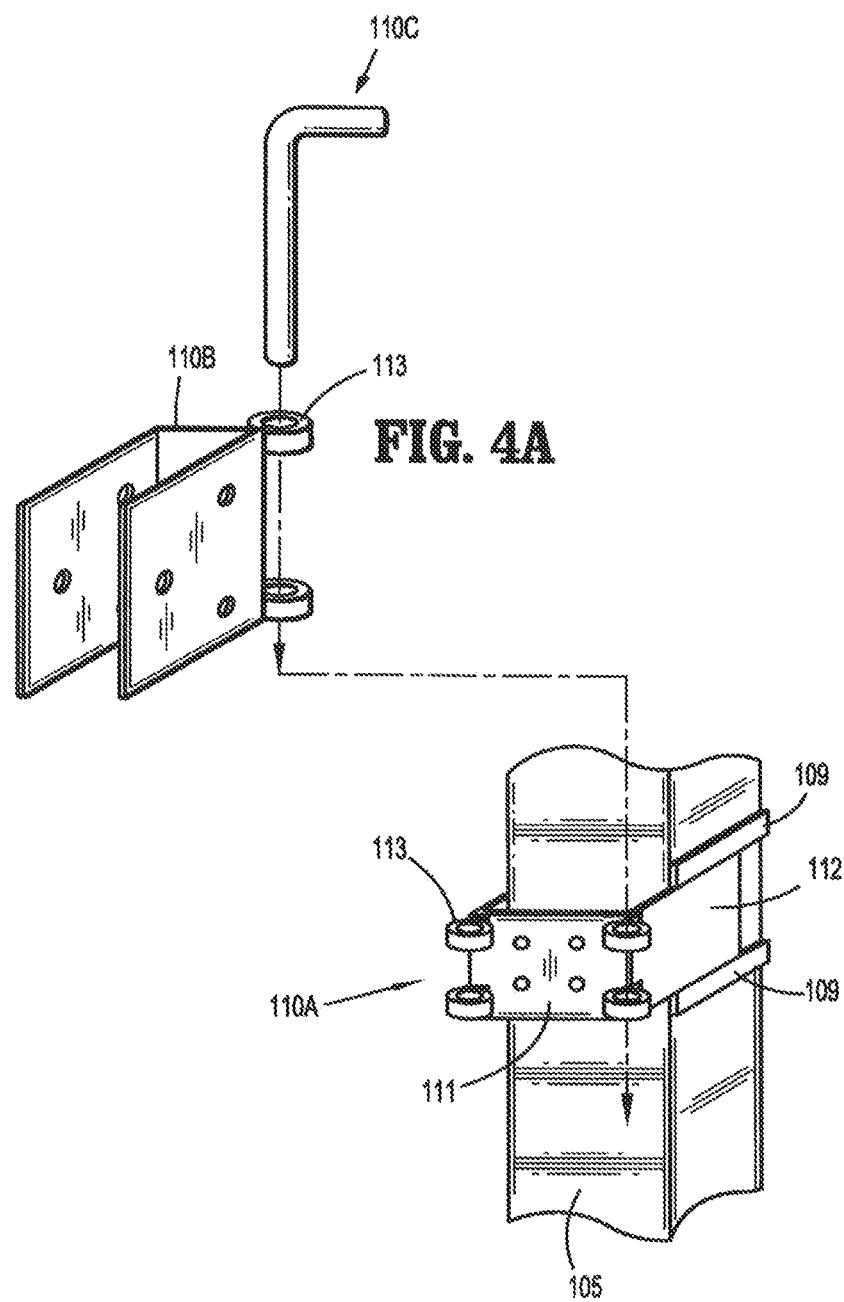
FIGS. 4A, 4B, 4C and 4D are schematic views of spring-loaded hinge systems according to an exemplary embodiment of the invention.
Figure 4C:
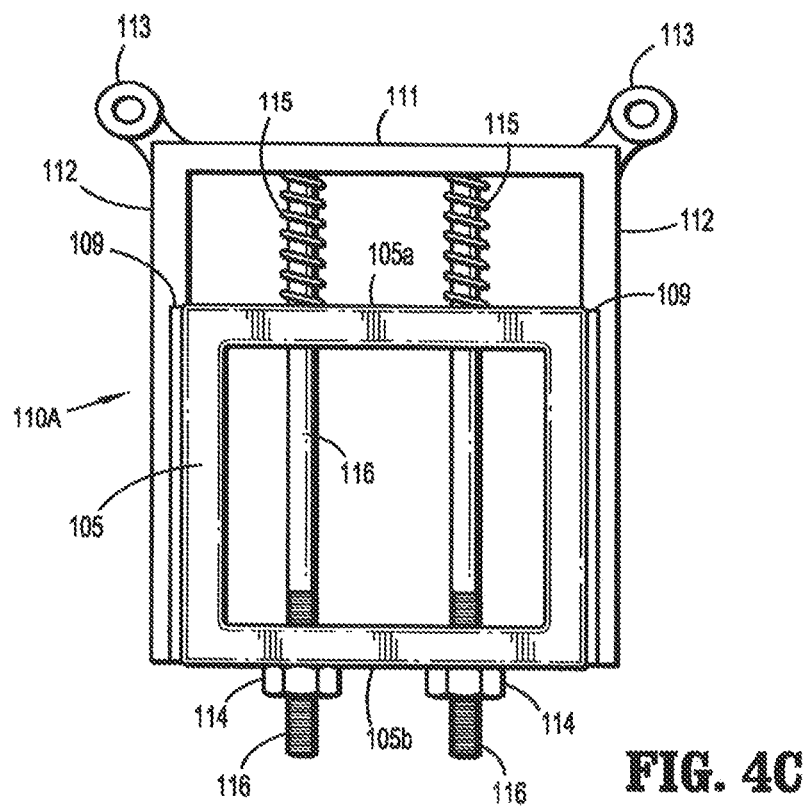
Figure 4D:
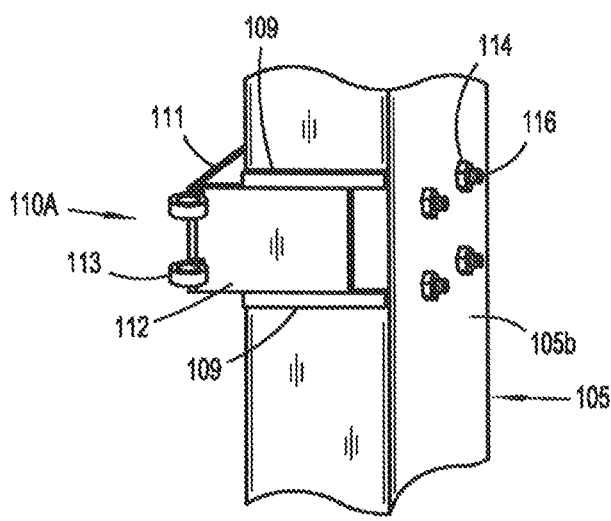

FIGS. 4A~4D are different schematic views of a spring loaded hinge system (110A and 110B) according to an embodiment of the invention. As shown in FIGS. 4A and 4B, the door hinge and jamb hinge elements (110A) and (110B) are pivotally connected to each other using a pin (110c) as in conventional pin hinge systems. As depicted in FIGS. 4B, 4C and 4D, the spring loaded hinge system (110a) includes a U-shaped bracket comprising a front plate (111) and side plates (112), which wraps around the three sides of the hinge jamb (105). A plurality of bolts (116) are connected to the front plate (111) and pass through apertures formed in the jamb (105), while the side plates (112) are disposed on the sides of the jamb (105) between guide rails (109). A plurality of spring elements (115) are disposed around the portions of the bolts between the face plate (111) of the hinge and the inner surface (105a) of the hinge jamb (105). The ends of mounting bolts (116) that protrude past the back surface (105b) include nuts that hold the ends of the bolts (116) from recessing back inwards due to the spring force of springs (115).

Overall, the exemplary training device (100) can be used to simulate forcible entry of a locked door which can be simulated as opening inward or outward, left hand opening or right band opening, steel jam or wood jam. All these factors of a door determine the method of forcible entry used by the firefighter encountering the door to be forced. In particular, FIG. 3D illustrates the use of a spring-loaded hinge system that connects a pair of doors (140) and (150) to the spring loaded hinge side door jamb so that the training prop provides the option of forcing both right and left hand opening doors.

For example, the door (140) can be used to simulate training of forcible entry on a right hand inward opening door or a left hand outward opening door with a metal or wood jamb. The door (150) can be used to simulate training of forcible entry on a left hand inward opening door or a right hand outward opening door with a metal or wood jamb. The removable jamb plate (120) with the door stop (121) allows forcible entry training using the ADZ end or fork end of a halligan tool for example, in an around the door stop and between the door and frame to force open the door. The jamb plate (120) with the door stop (121) can be made removable to allow it to be readily changed with a new jamb plate in instances where, for example, the door stop (121) of the jamb plate (120) become damaged from extended use over time.

Figure 1:
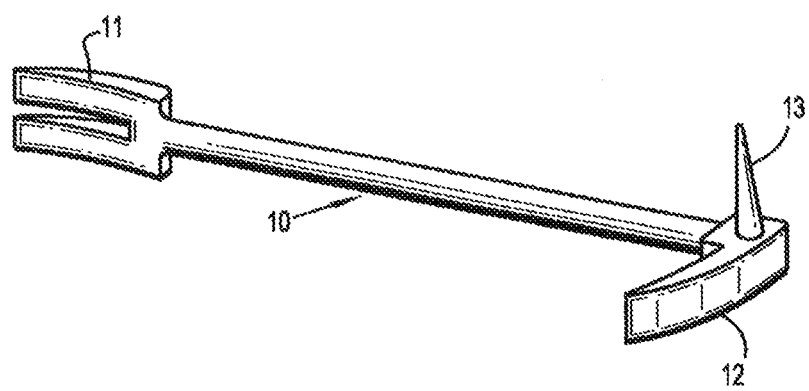
FIG. 1 illustrates a conventional Halligan forcible entry tool.

The wood block (108) disposed in a recessed portion (107) of the door stop jamb (103) can be used for simulated training of forcible entry on a left hand inward opening door (150) with a wood jamb using the spike end of a Halligan tool, as well as simulated training of forcible entry on a right hand inward opening door (140) with a wood jamb using a spike end of a Halligan tool. With this procedure, the Pike (13) of the halligan tool (10) (FIG. 1) is forcibly driven into the wood block (108) by taking a "baseball bat swing" or driving the Pike into the wood block (108) using an axe or maul. The halligan tool (10) is then pushed to the door, and the ADZ end pushes against the door to gap the door or force it open.

Although the frame members of the training prop are made of steel, the wood block (108) simulates a wood door frame to allow forcible entry training with wood frames. As the wood block (108) becomes damaged over time, it may be replaced with a new wood block. The wood block (108) may be made from pieces of plywood that are stacked to provide a sufficient thickness to bury the pike end. As shown in FIG. 3B, the recess (107) in which the wood block (108) can be inserted has a large aperture (107A) to allow room for the pike end to be buried deep in the wood block (108) without hitting the metal frame (103). The wood block (108) can be bolted in the recess (107) using bolts that extend through the wood block (108) and through apertures (107b) formed in back plate portion of the recessed (107) and the outer face of the jamb (103).

The spring loaded hinge system (110a, 110b) allows provide a spring loaded action which compresses with sufficient resistance when forcing the door away from the stop jamb (103) towards the hinge jamb (105) when simulating forcible entry using a Halligan tool for instance. In this process, the forces that are encountered are simulated by the spring loaded compressive forces of the hinge system (110a, 110b) and by the resistance forces generated by the resistance bars.

Figure 5A:
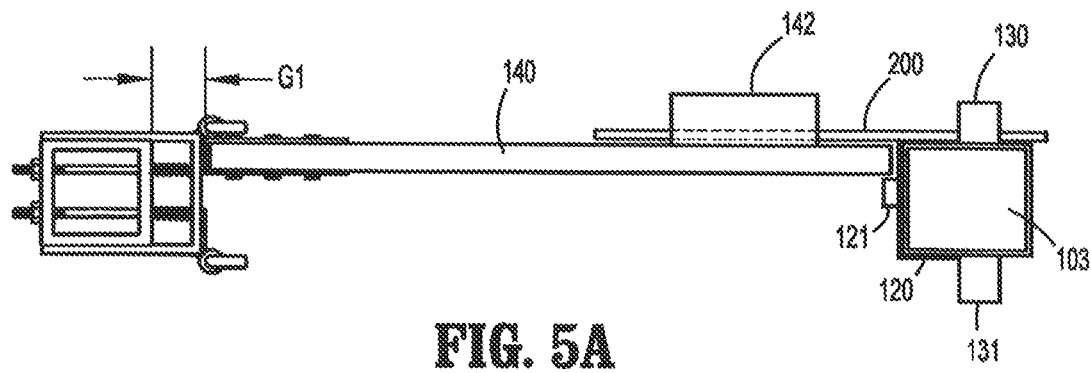
FIGS. 5A, 5B and 5C schematically illustrate an exemplary mode of operation of a forcible entry door training apparatus according to an exemplary embodiment of the invention.
Figure 5B:
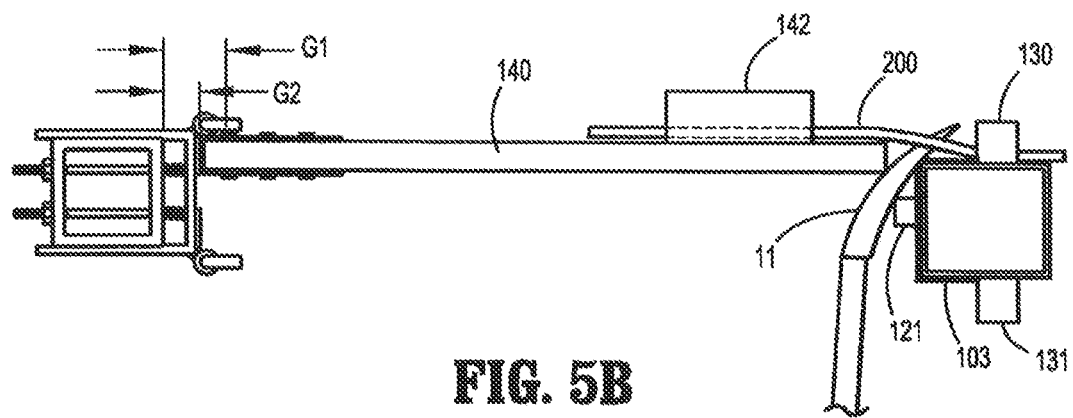
Figure 5C:
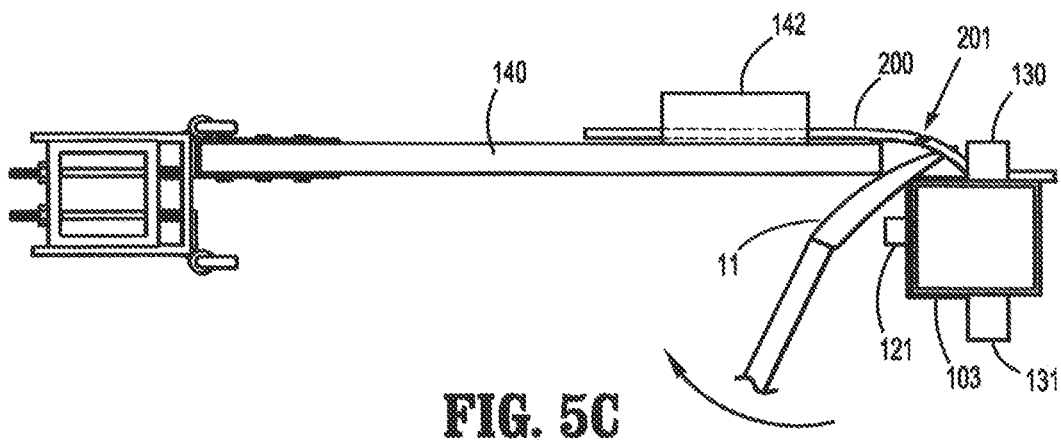

FIGS. 5A, 5B and 5C illustrate a method of use of the forcible entry training door according to an exemplary embodiment of the invention. In particular, FIGS. 5A, 5B and 5C illustrate a method of use of the forcible entry training door to simulate forcible entry on a right hand inward opening door with a metal jamb according to an exemplary embodiment of the invention. As shown in FIG. 5A, a resistance bar (200) (e.g., a 1×2 length of wood furring strip) is inserted through channel 130A and 142A of respective retaining brackets (130) and (142). In an initial step the method of forcing an inward operating door (140) may begin with using the ADZ end of a Halligan tool to "gap" the door and create a "purchase" between the stop (121) and the door (140). With this process, an individual would forcibly insert the ADZ end of the Halligan tool between the edge of the door (140) and the door stop (121) and the individual would push up or down on the Halligan bar causing the ADZ end to rotate and crease the door which, in the Prop, would create a gap between the door (140) and the stop (121), but which in reality would bend the door edge or stop and create a purchase. In this process, the resistance bar (200) simulates the resistance that would be encountered with a locked door.

FIG. 5B illustrates a next step in a method of forcing the inward opening door (140) using the fork end (11) of the Halligan tool to force the fork end of the Halligan tool through to the opposing side of the door. In this process, the Halligan tool is set by placing the bevel of the fork (11) against the door (140) and driving the fork end (11) in using an axe or maul. This involves working the fork end (11) of the Halligan tool into the gap to spread the edge of the door (140) away front the frame jamb (103). As the door (140) moves away from the jamb (103), the hinge springs are compressed to decrease the initial gap G1 to the smaller gap G2 to absorb the increased gap between door (140) and jamb (103). The Halligan Tool is considered set when the fork is locked in to the inside of the doorframe. In this process, the forces that are encountered are simulated by the spring loaded compressive forces of the hinge system (110a, 110b) and by the resistance forces generated by the resistance bar (200).

Next as depicted in FIG. 5C, once set, force is applied to the halligan tool in the direction indicated by the arrow to create leverage against the door (140) and flex the door. In this process, the spreading force is absorbed by the spring loaded hinges, which create resistance force to simulate the forces that are applied during setting and forcing of the door using the Halligan tool, while avoiding damaging, creasing or bending of the door or frame. Moreover, as the halligan tool is forced to the door (140), the resistance bar (200) starts to bend and eventually cause a break (201) in the bar. The resistance bar (200) simulates the resistance encountered when forcing the door to break a lock.

In other embodiments, when wood studs are not used for simulating resistive forces of locked doors, a bungee cord (or heavy rubber strip) may be used to apply enough resistive force to maintain the door from swinging open while a person trains on "gapping" the door for various methods of forced entry.

Figure 6:
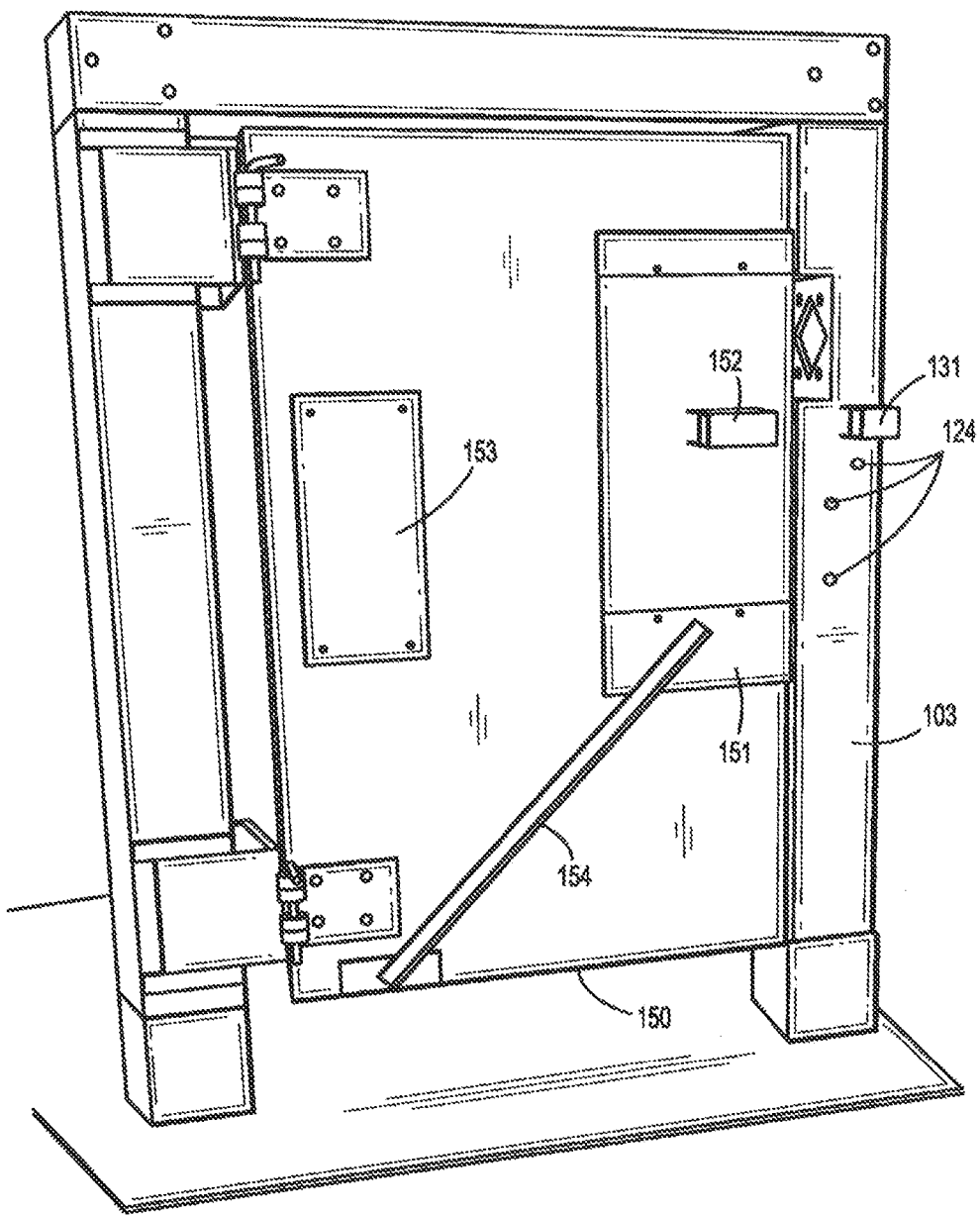
FIG. 6 is a schematic plane view of a forcible entry door training apparatus according to another exemplary embodiment of the invention.

FIG. 6 is a schematic plane view of a forcible entry door training apparatus according to another exemplary embodiment of the invention. In FIG. 6, the door (150) in FIG. 3A is modified to include a protective thin steel plate (153) on the hinge side portion of the door (150) and a reinforcing bar (154), which provide added strength and protection and structural integrity to the door (150).

In particular, the steel plate (153) can be disposed on the lace of the door (150) in an area that may be hit by the end of a halligan tool when forcing the tool to the door during training of forcible entry for a right handed outward opening door. A similar steel plate can be disposed on the opposite side of the door (150) to provide added strength of the door face from being hit by the end of a halligan tool when forcing the tool to the door (150) during training of forcible entry for a left handed inward opening door.

Moreover, the reinforcing bar (154) may be employed to prevent the door (150) from being bent when forcing the door using the Halligan tool at points between the door (140) and jamb (103) that are far from the retaining brackets (131) and (152) where the resistive forces are generated with a resistance bar inserted through the brackets. A second reinforcing bar can be disposed on the opposite side of the door (150) in alignment with the reinforcing bar (154) and bolted together through the door (150). The reinforcing bar (154) may be welded to the face of the metal door (150).

Figure 7:
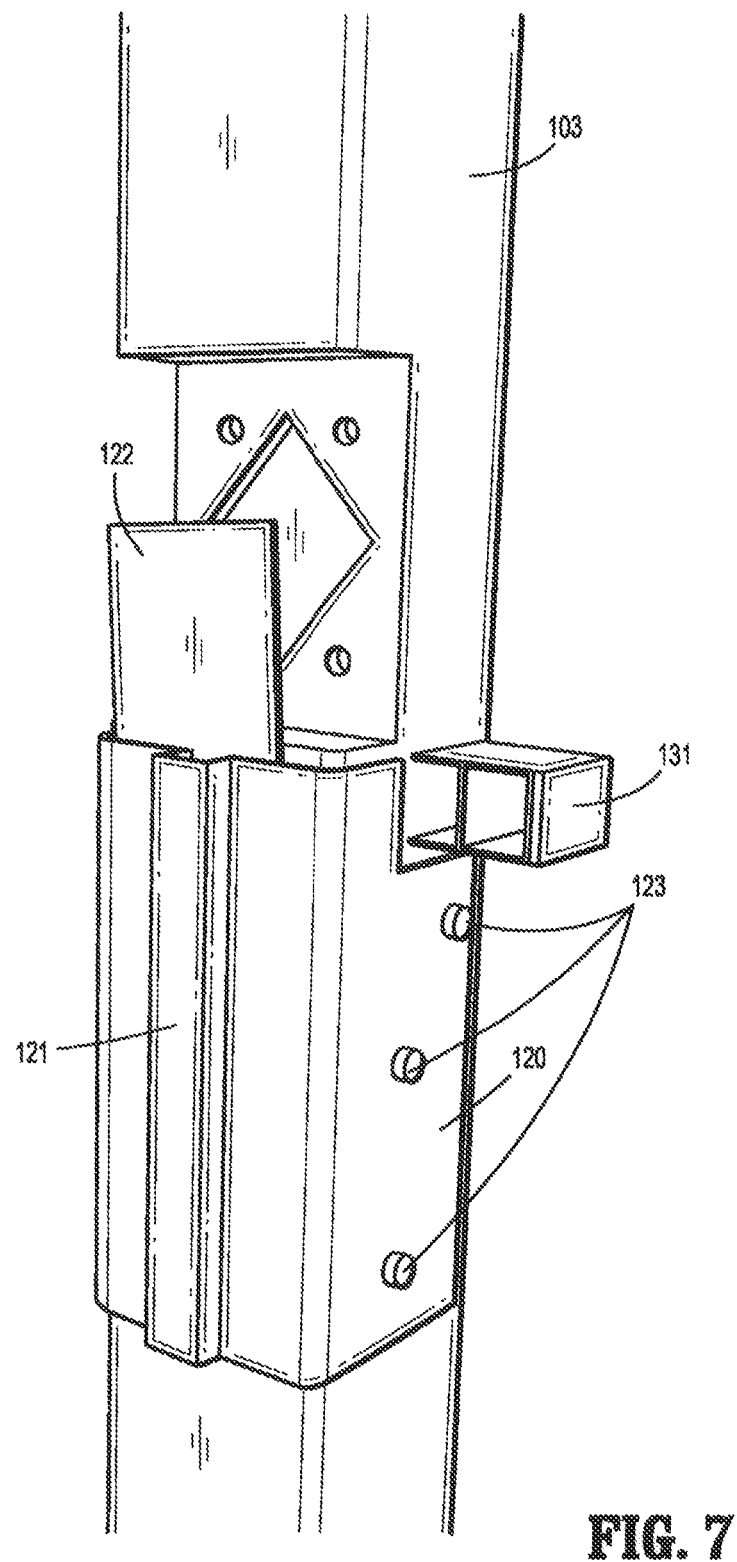
FIG. 7 is a schematic perspective view of components of a forcible entry door training apparatus according to another exemplary embodiment of the invention.

FIG. 7 is a schematic perspective view of components of a forcible entry door training apparatus according to another exemplary embodiment of the invention. FIG. 7 illustrates an embodiment in which the removable jamb plate (120) is laterally adjustable to adjust the size of the gap between the edge of the doors and the jamb plate (120). One or more shim plates (122) can be inserted between the jamb (103) and the jamb plate (120) to decrease the gap between the edge of the doors and the face of the jamb plate (120). To provide lateral adjustment, the bolts (123) that connect the jamb plate (120) to the jamb (103) are inserted through apertures (124) of the jamb (103) (see FIG. 6) that are larger in size or shape then the diameter of the bolts (123). The shims (122) can be designed with thicknesses to provide adjustability in $1/16$ inch increments, for example, line adjustability of the removable jamb plate (120) allows simulated forcible entry training on "gapping" outward opening doors with tighter seams between the door and frame.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

I claim:

1. A forcible entry door training apparatus, comprising:
   a base plate;
   a door frame mounted to the base plate, the door frame comprising a first side jamb, a second side jamb and a header jamb coupled between upper ends of the first and second side jambs; and a door having a first side edge and a second side edge; and at least one hinge attaching the first side edge of the door to the first side jamb of the door frame for hingedly mounting the door within the door frame, wherein the at least one hinge is mounted to the first side jamb for slidable motion to and way from an inner surface of the first side jamb and wherein the at least one hinge includes springs that bias the at least one hinge away from the inner surface of the first side jamb and which resist compression with sufficient force to simulate forces that are encountered when attempting to wedge a pry tool between a door and a door jamb.

2. The forcible entry door training apparatus of claim 1, wherein the at least one hinge is comprises a U-shaped bracket comprising a front plate that is disposed adjacent the inner surface of the first side jamb, and side plates that are disposed on each side of the first side jamb.

3. The forcible entry door training apparatus of claim 2, wherein the side plates of the U-shaped bracket is slidably disposed between guide rails on the side surfaces of the first side jamb.

4. The forcible entry door training apparatus of claim 1, wherein the at least one hinge is adapted to hingedly mount at least two doors within the door frame.

5. The forcible entry door training apparatus of claim 1, farther comprising a removable jamb plate including a door stop attached to the second side jamb.

6. The forcible entry door training apparatus of claim 5, wherein the removable jamb plate is adjustable to change a spacing between the second side edge of the door and the jamb plate.

7. The forcible entry door training apparatus of claim 1, further comprising a wood block removably inserted in a recess formed in the second side jamb.

8. The forcible entry door training apparatus of claim 1, further comprising a first retaining bracket disposed on the door and a second retaining bracket disposed on the second side jamb, aligned to the first retaining bracket, wherein the first and second retaining brackets insertably receive an elongated resistance member to simulate resistive forces of a locking device to keep the door from opening.

9. The forcible entry door training apparatus of claim 8, further comprising an elongated resistance member extending through the first and second retaining brackets.

10. The forcible entry door training apparatus of claim 9, wherein the elongated resistance member is a length of wood.

11. The forcible entry door training apparatus 4 claim 1, wherein the door comprises an elongated steel bar mounted to a surface of the door.

12. A forcible entry door training apparatus, comprising:

a door frame comprising a first side jamb and a second side jamb;

a door having a first side edge and a second side edge; and at least one spring-loaded hinge that connects the first side edge of the door to the first side jamb of the door frame, wherein the at least one spring-loaded hinge is biased to maintain a first gap between the first side edge of door and the first side jamb of the door frame, wherein the at least one spring-loaded hinge is compressed to decrease the first gap in response to a spreading force applied by a pry tool wedged between the second side edge of the door and the second side jamb, and wherein the at least one spring-loaded hinge is configured to resist compression with sufficient force to simulate forces that are encountered when attempting to wedge the pry tool between a door and a door jamb.

13. The forcible entry door training apparatus of claim 12, wherein the at least one spring-loaded hinge is adapted to hingedly mount at least two doors within the door frame.

14. The forcible entry door training apparatus of claim 1, wherein the apparatus simulates forcible entry on a right hand inward opening door, a left hand inward opening door, a right hand outward opening door and as left hand outward opening door.

15. The forcible entry door training apparatus of claim 12, further comprising a first retaining bracket disposed on the door and as second retaining bracket disposed on the second side jamb, aligned to the first retaining bracket, wherein the first and second retaining brackets insertably receive an elongated member to simulate a locking device to keep the door from opening.

16. The forcible entry door training apparatus of claim 12, wherein the door comprises an elongated steel bar mounted to a surface of the door.

17. A method for simulating forcible entry of a locked door, comprising:

wedging a tool between a door frame and a first side of a door, said door having a second side, opposite the first side, which is hingedly connected to the door frame by at least one spring-loaded hinge;

compressing springs of the at least one spring-loaded hinge in response to a spreading force caused by the wedging; and allowing the first side of the door to be spread away from the door frame in response to the compressing, wherein in response to the spreading force caused by the wedging, the at least one spring-loaded hinge resists compression with a sufficient force to simulate forces that are encountered when attempting to wedge said tool between a door and a door frame.

\* \* \* \* \*